Dec. 5, 1933.   S. J. BEEBE   1,937,505

SALT DISPENSER

Filed Aug. 26, 1932

Inventor:
Stanley J. Beebe;
by Lester L. Sargent
Atty.

Patented Dec. 5, 1933

1,937,505

UNITED STATES PATENT OFFICE 1,937,505

SALT DISPENSER

Stanley J. Beebe, Brownsville, Tex., assignor of thirty-three percent to George A. Covacevich, Brownsville, Tex.

Application August 26, 1932. Serial No. 630,599

2 Claims. (Cl. 65—45)

The object of my invention is to provide a dispenser for salt or sugar which is adapted to prevent the salt from caking and clogging the discharge end.

It is also an object of my invention to provide a salt shaker so constructed that it may be placed on the table with the discharge end pointing downward without spilling any appreciable amount of salt, and which is thereby adapted to close the discharge end of the shaker against the admission of air and thus prevent the clogging of the shaker even in damp climates.

It is also an object of my invention to provide a salt shaker having a single novel tubular discharge opening.

I attain these and other objects of my invention by the devices illustrated in the accompanying drawing, in which,—

Like numerals designate like parts in each of the several views.

Figure 3:
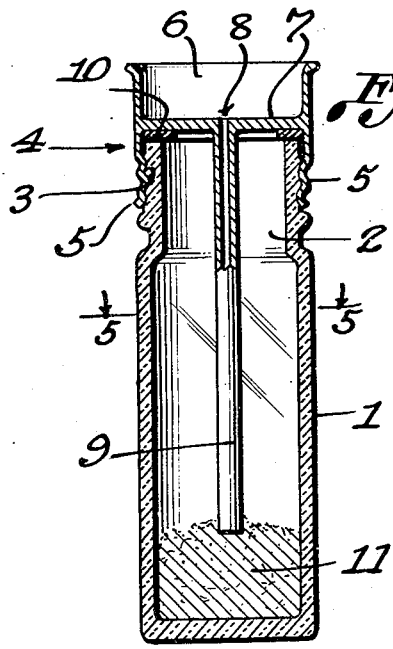
Fig. 3 is a vertical section through the form of the invention shown in Fig. 1.
Figure 4:
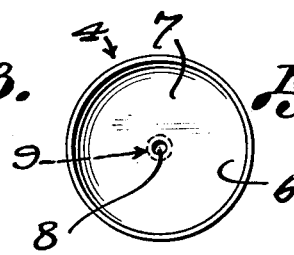
Fig. 4 is a top plan view of Fig. 1 and it also is a bottom plan view of Fig. 2.
Figure 5:
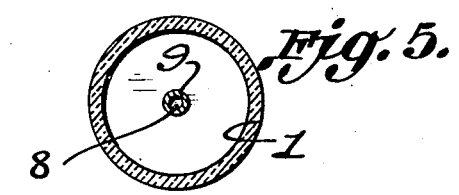
Fig. 5 is a transverse section on line 5—5 of Fig. 3.

Referring to the accompanying drawing, I provide a suitable body member 1 which may be of any suitable material, such as glass, metal or wood, having a neck 2, which is exteriorly threaded at 3. I provide a novel cover element 4 having a threaded portion 5 to detachably engage the threaded portion 3 of the neck of the salt shaker and having an annular rim 6 extending beyond the horizontal cover element 7. At the center of the cover element 7 I provide a long tube 9 preferably of celluloid or glass extending nearly to the bottom of the shaker body 1, this tube having a smaller discharge channel 8 through which the salt is discharged. I may provide a suitable washer 10 seating between the cover element 7, which preferably is a flat top member and the upper edge of the bottle neck 2, as shown in Fig. 3.

Figure 1:
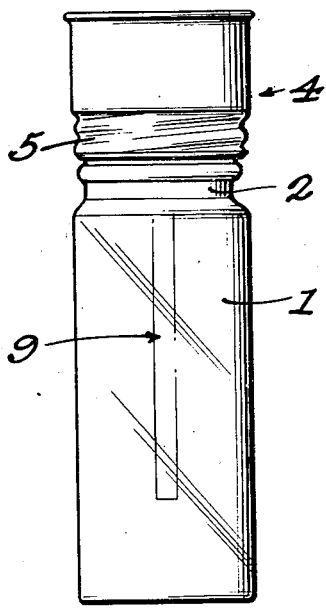
Figure 1 is a side elevation of my invention.
Figure 2:
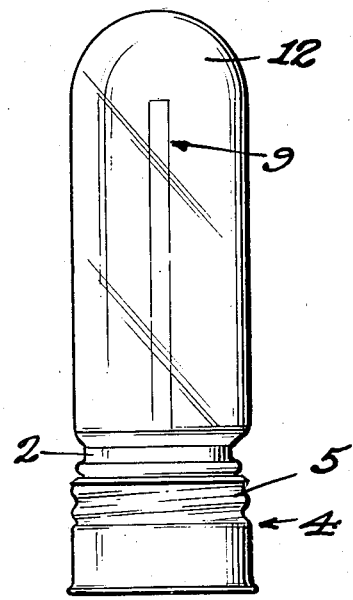
Fig. 2 is a side elevation of a modified form of the invention.

This construction of the salt shaker permits of the shaker being set on the table or counter with either end up and will prevent any material caking of the salt, regardless of which end is uppermost, in ordinary climates. In sea shore zones where salt rapidly becomes water logged the caking of the salt can be prevented by setting the shaker down with the discharge orifice down. For use in such climates the form of the invention shown in Fig. 2 is used which on account of the rounded end 12 makes it necessary that the shaker be set down on the cover member 4 as illustrated.

In using the shaker it is inverted and shaken rapidly up and down, the salt 11 being discharged through the long channel 8 of the single tube 9. No matter how much salt is in the container, the same amount of salt is discharged through motion up and down of the container. This is true even though the contents of the salt shaker be very low. Little moisture can enter the container due to the length of the tube, which as noted above extends nearly to the bottom of the shaker body, the length of this channel through this tube preventing the moisture getting inside the sugar as readily as with the old style perforated top salt shakers. As the tube 9 is of celluloid or glass it will not absorb moisture and cause the salt to cake and close the mouth of the channel 8 as will a metal tube.

It is within the contemplation of my invention to vary the size of the tube to meet the demands or requirements of possible larger or so-called hotel or kitchen shakers. With the size of the tube the delivery of the salt is increased or decreased with each motion of the shaker body.

It is also within the contemplation of my invention to make the shaker of all glass, or of metal and part glass or celluloid, or of wood or part wood only, as may be found most desirable. By providing it with a tube of smaller size it may be used as a dispenser for pepper or spices of any kind.

What I claim is:

1. In a salt shaker, the combination of a shaker body having its closed end rounded, and having its open end provided with a threaded neck, a cover member having an annular threaded flange to engage the threaded neck of the shaker body, and having a top member provided with a centrally positioned elongated tube of small diameter extending nearly to the bottom of the shaker body for the discharge of a fine stream of salt therethrough, and an annular extension rim integral with the cover member to function as a base for the salt shaker when seated on the table or counter.

2. In a salt shaker, the combination of a shaker body having its open end provided with a threaded neck, a cover member having an annular threaded flange to engage the threaded neck of the shaker body and having a top member provided with a centrally positioned elongated tube of small diameter extending nearly to the bottom of the shaker body for the discharge of a fine stream of salt therethrough, and an annular extension rim integral with the cover member to function as a base for the salt shaker when seated on the table or counter.

STANLEY J. BEEBE.